(12) United States Patent
Carnevali

(10) Patent No.: US 7,296,752 B2
(45) Date of Patent: Nov. 20, 2007

(54) BODY STRAP MOUNT

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 0 days.

(21) Appl. No.: 11/317,426

(22) Filed: Dec. 22, 2005

(65) Prior Publication Data

US 2007/0145149 A1    Jun. 28, 2007

(51) Int. Cl.
*G06K 7/10* (2006.01)
(52) U.S. Cl. .............. 235/462.44; 235/462.43; 235/462.45; 235/472.01
(58) Field of Classification Search .......... 235/462.43, 235/462.44, 462.45, 472.01
See application file for complete search history.

(56) References Cited

U.S. PATENT DOCUMENTS

| | | | |
|---|---|---|---|
| 2,519,330 A | 8/1950 | Evan et al. | |
| 2,886,481 A | 5/1959 | Swan | |
| 4,110,139 A | 8/1978 | Mashida et al. | |
| 4,183,986 A | 1/1980 | Blaetterlein | |
| 4,398,277 A | 8/1983 | Christiansen et al. | |
| 4,700,874 A | 10/1987 | Mock et al. | |
| 4,708,492 A | 11/1987 | Mock et al. | |
| 4,732,140 A | 3/1988 | Stoffregen | |
| 4,760,714 A | 8/1988 | Mock et al. | |
| 5,134,538 A | 7/1992 | Weiss | |
| 5,272,324 A * | 12/1993 | Blevins ................ | 235/462.44 |
| D377,467 S | 1/1997 | Weimer | |
| 5,594,511 A | 1/1997 | Lin | |
| 5,600,854 A | 2/1997 | Henrekin | |
| 5,610,387 A * | 3/1997 | Bard et al. ............. | 235/462.44 |
| 5,657,201 A * | 8/1997 | Kochis ....................... | 361/686 |
| 5,915,535 A | 6/1999 | Henrekin-Jordan | |
| 6,031,166 A | 2/2000 | Petrarca | |
| 6,256,387 B1 | 7/2001 | Wang | |
| 6,510,717 B1 | 1/2003 | Levi | |
| 2003/0209604 A1* | 11/2003 | Harrison, Jr. .......... | 235/462.44 |
| 2005/0139679 A1* | 6/2005 | Salvato .................. | 235/462.44 |

* cited by examiner

*Primary Examiner*—Thien M. Le
*Assistant Examiner*—April A. Taylor
(74) *Attorney, Agent, or Firm*—Charles J. Rupnick, Attorney at Law (57) ABSTRACT

A strap-on mounting apparatus includes a chassis having a frame formed by a pair of spaced-apart brackets having flexible couplings for removably mounting the mounting apparatus on a wearer's arm or leg extremity. The chassis rotatably supports a cradle that is structured for removably mounting a hand-held portable device of a type normally carried by people on their person. The cradle is rotatable relative to the chassis between different relative orientations. For example, the cradle is rotatable relative between a normal operational orientation that is substantially crosswise to the arm or leg extremity, and a normal stored orientation that is substantially aligned with the extremity, with the cradle passing through a continuous series of intervening rotational orientations any of which may be useful as an operational orientation.

21 Claims, 11 Drawing Sheets

Fig. 17

BODY STRAP MOUNT

FIELD OF THE INVENTION

The present invention relates to a mounting apparatus, and in particular to apparatus for removably mounting normally hand-held portable devices on arm or leg extremities of the human body.

BACKGROUND OF THE INVENTION

It is well known that today many people rely on normally hand-held portable devices in their everyday lives for doing inventories; keeping track of keeping track of stock and appointments; communicating with friends, family and business associates; accessing and retrieving important information, and even playing games in spare moments. To accomplish these important tasks, the individual carries a cellular telephone, a PDA or personal digital accessory, or even a hand-held computer to name a few of the more common hand-held portable devices in typical everyday lives. To date, we carry these devices in pockets or purses where they are out of the way but inaccessible, or at our waists slung from our belts where they are more accessible but still unusable and always in the way of our hands, coats, desks, counter tops and countless other waist-high obstacles.

SUMMARY OF THE INVENTION

The present invention overcomes limitations of the prior art by providing a strap-on apparatus for mounting any of the normally hand-held portable devices in easy reach in a convenient, accessible but out of the way place on our bodies, such as an arm or leg extremity, though the apparatus may be strapped-on a shoulder or other part of the body as well.

The strap-on mounting apparatus of the present invention includes a substantially rigid chassis having a frame that is formed by a pair of spaced-apart brackets that are structured to removably mount the mounting apparatus on an arm or leg extremity using, for example, a pair of flexible couplings such as conventional ties, straps or belts laced through molded slots in the brackets. The brackets help to stabilize the body mounting apparatus on the wearer's body. The chassis rotatably supports a substantially rigid cradle that is structured for removably mounting an actual normally handheld portable device, such as a cellular telephone, a PDA or personal digital accessory, a hand-held computer, or another of the hand-held portable devices typically carried by people on their person. The cradle is rotatable relative to the chassis between different relative orientations. For example, the cradle is rotatable relative between a normal operational orientation that is substantially cross-wise to the body extremity and a normal stored orientation that is substantially aligned with the body extremity, with the cradle passing through a continuous series of intervening rotational orientations any of which may be useful as an operational orientation.

According to one aspect of the invention, the cradle is rotatably coupled to a central wheel face of a chassis by a pair of connectors passing through substantially concentric arcuate or part-circular grooves or slots that are formed through the wheel face. When the connectors are threaded connectors, nuts on the connectors can be tightened for tensioning or pre-loading the interface between the cradle and the chassis to stiffen the relative rotation and keep the cradle from swinging under its own weight. Alternatively, wave or spring washers are positioned between the connector and the chassis for tensioning or pre-loading the interface.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 15, 16 and 17 illustrate another alternative embodiment of the strap-on body mounting apparatus of the invention, wherein

DETAILED DESCRIPTION OF PREFERRED EMBODIMENT

In the Figures, like numerals indicate like elements.

Figure 1:
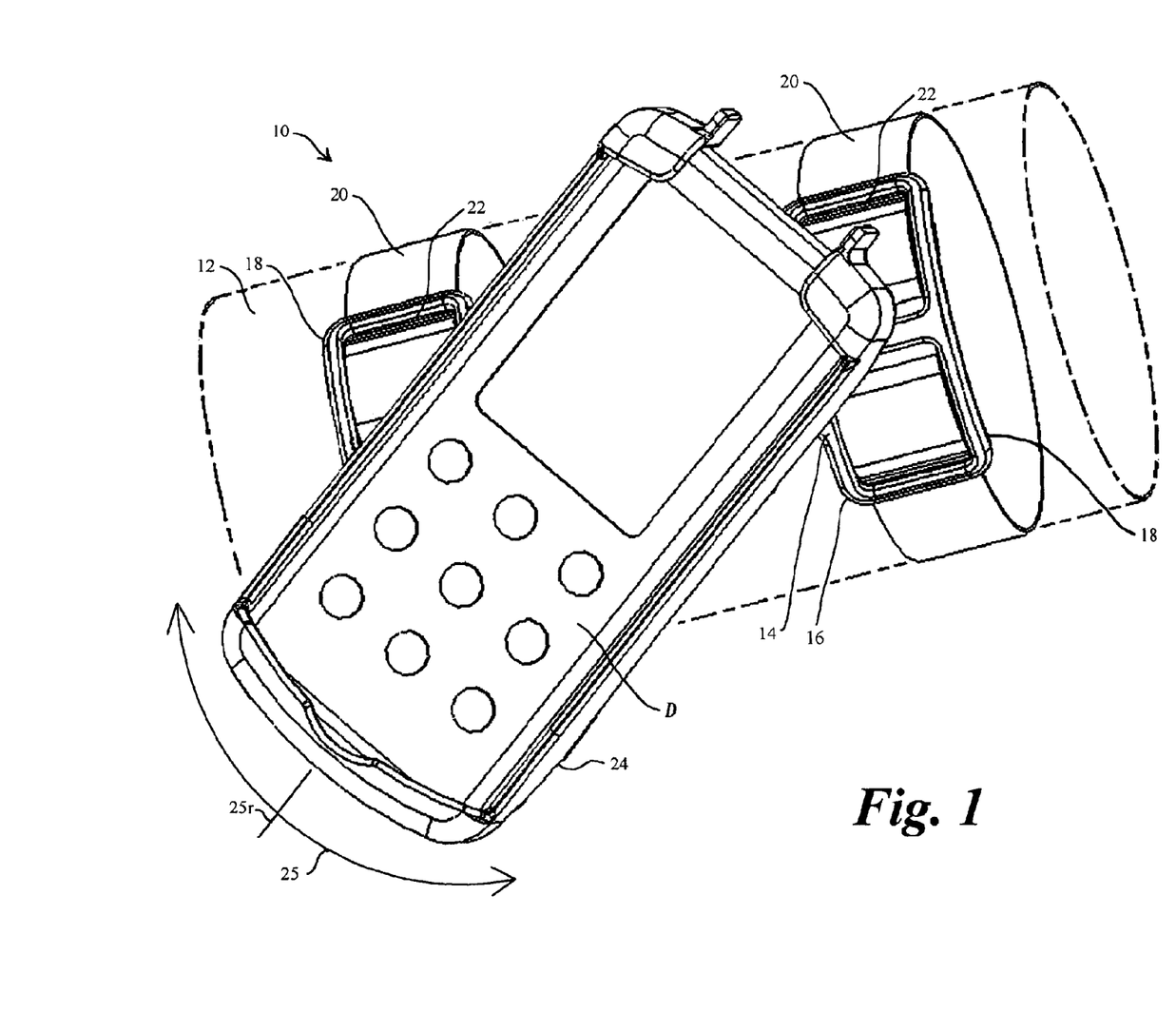
FIG. 1 is a perspective view that illustrates the present invention by example and without limitation embodied as a strap-on body mounting apparatus.

FIG. 1 illustrates the present invention by example and without limitation embodied as a body mounting apparatus 10 for removably mounting normally hand-held portable devices in easy reach in a convenient, accessible but out of the way place on an arm or leg extremity 12 (shown in phantom) for example, of a human body. Mounting apparatus 10 includes a substantially rigid chassis 14 having a frame 16 (more clearly shown in subsequent figures) that is formed by a pair of spaced-apart brackets 18 that are structured to removably mount the mounting apparatus 10 on an arm or leg extremity 12 using, for example, a pair of flexible couplings 20. By example and without limitation, the flexible couplings 20 are provided as conventional ties, straps or belts laced through molded slots 22 in brackets 18. Alternatively, the chassis 14 is placed on the wearer's shoulder with one of the straps 20 wrapping under that arm and the other strap 20 traveling across the chest and under the wearer's opposite arm. The brackets 18 help to stabilize the body mounting apparatus 10 on the extremity 12 or other body part, such as the wearer's shoulder. Chassis 14 rotatably supports a substantially rigid cradle 24 that is structured for removably mounting an actual normally hand-held portable device D such as a cellular telephone, a PDA or personal digital accessory, a hand-held computer, or another of the hand-held portable devices typically carried by people on their person. Cradle 24 is rotatable relative to chassis 14 between different relative orientations 25. For example, the cradle 24 is rotatable relative to chassis 14 between a normal operational orientation 25a that is substantially cross-wise to the body extremity 12 (shown in FIG. 2) and a normal stored orientation 25b (shown in FIG. 3) that is substantially aligned with the body extremity 12, with the cradle 24 passing through a continuous series of intervening rotational orientations 25r (shown here) any of which may be useful as an operational orientation.

Figure 2:
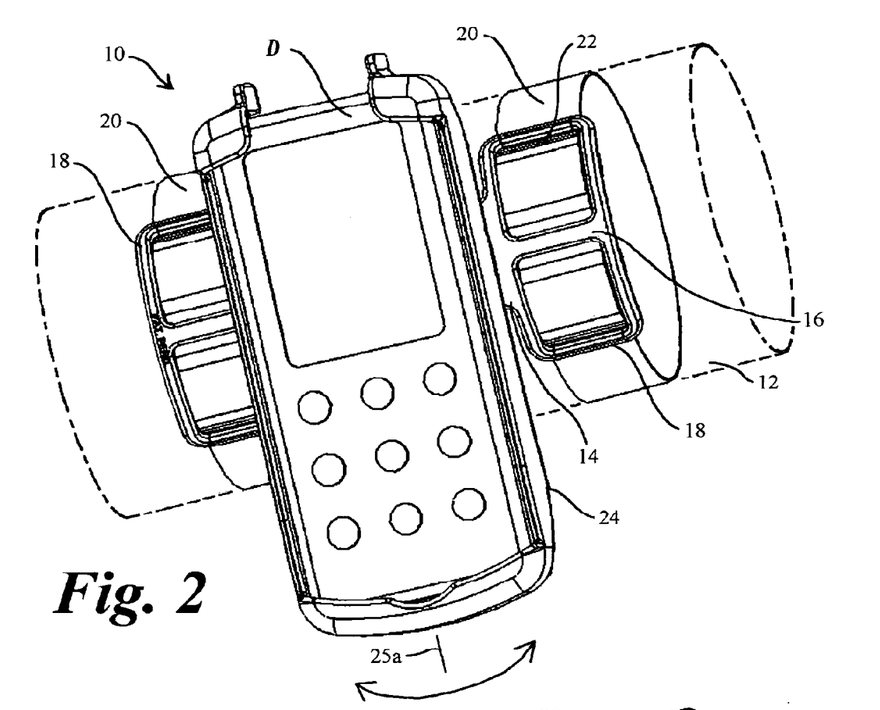
FIG. 2 is a perspective view that illustrates a cradle portion of the strap-on body mounting apparatus being rotated relative to a chassis portion into a normal operational orientation.

FIG. 2 illustrates the cradle 24 rotated relative to chassis 14 into the normal operational orientation 25a that is substantially cross-wise to the body extremity 12.

Figure 3:
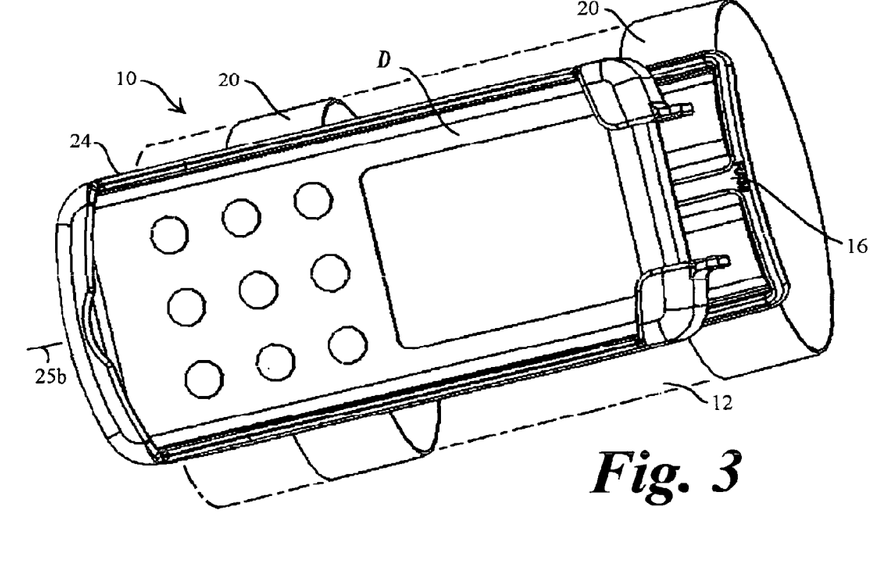
FIG. 3 is a perspective view that illustrates the cradle portion of the strap-on body mounting apparatus being rotated relative to the chassis portion into a normal stored orientation.

FIG. 3 illustrates the cradle 24 rotated relative to chassis 14 into the normal stored orientation 25b that is substantially aligned with the body extremity 12.

Figure 4:
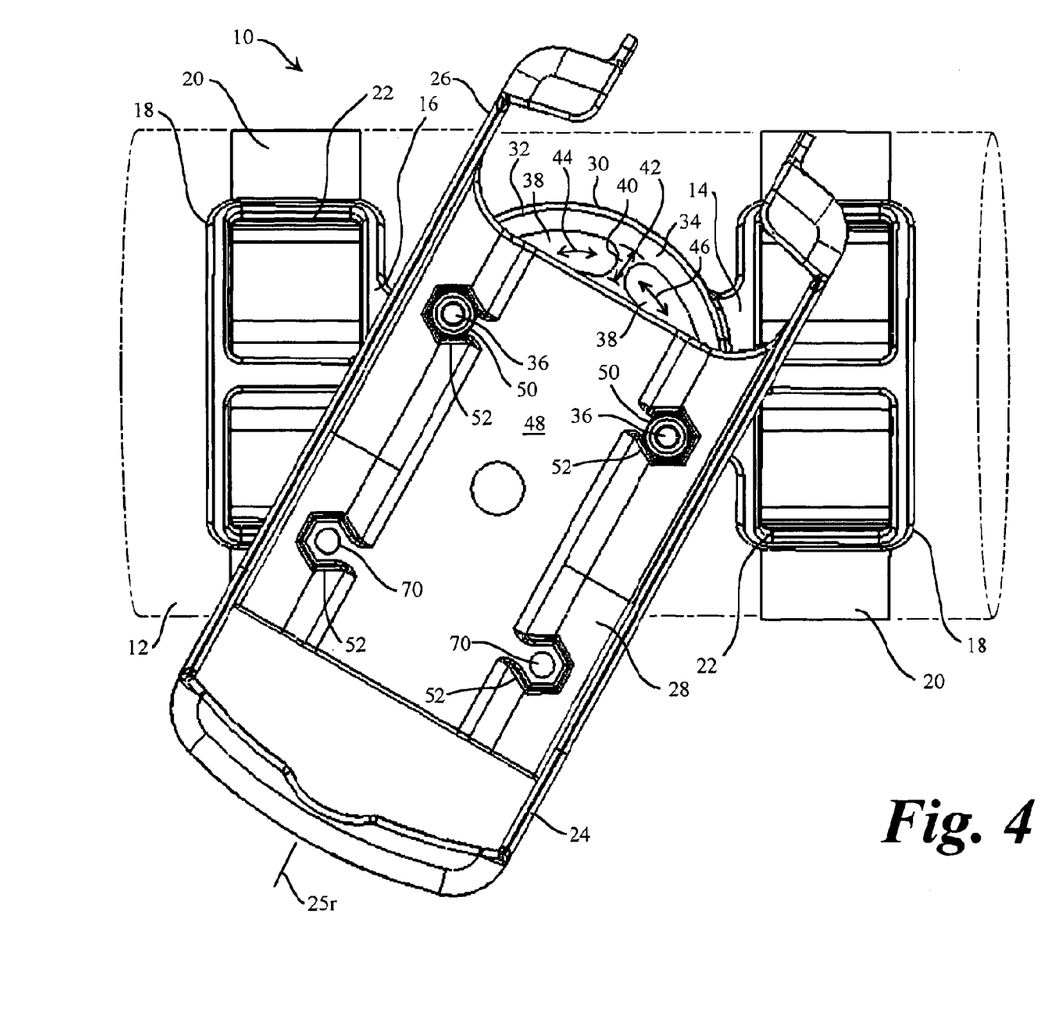
FIG. 4 is a plan view that illustrates the strap-on body mounting apparatus of the invention without the hand-held portable device being installed in the cradle, the cradle being illustrated by example and without limitation as positioned between the normal stored and operational orientations.

FIG. 4 illustrates the body mounting apparatus 10 of the invention without the hand-held portable device D being installed in the cradle 24. The cradle 24 is illustrated by example and without limitation as being positioned in one of the continuous series of intervening rotational orientations 25r between the normal operational orientation 25a and normal stored orientation 25b. The cradle 24 includes rigid or flexible retention structure, indicated generally at 26, for securely retaining the normally hand-held portable device D, for example compressed against a back plane 28 of cradle 24 positioned adjacent to the chassis 14. For example, the cradle 24 is, by example and without limitation, structured according to any of co-pending patent applications filed in the name of the inventor of the present invention, including U.S patent application Ser. No. 10/636,058 for "Secure Interface Cradle for Pocket Personal Computer Device" filed Aug. 7, 2003; U.S patent application Ser. No. 10/607,938 for "Universal Mobile Electronic Device Holder And Carrying Case" filed Jun. 27, 2003; and U.S patent application Ser. No. 11/136,797 for "Secure Universal Mounting Apparatus" filed May 24, 2005, the respective entirety of all being incorporated herein by reference. Optionally, cradle 24 is structured according to any other known device cradle, including by example and without limitation: U.S. Pat. No. 6,427,959 for "Mounting Bracket for an Electronic Device" issued to Kalis, et al. on Aug. 6, 2002; U.S. Design Patent D377,798 for "Portable Telephone Holder" issued to Heine on Feb. 4, 1997; U.S. Pat. No. 6,095,470 for "Ejecting Electronic Instrument Mount" issued to Kalis on Aug. 1, 2000; U.S. Pat. No. 5,457,745 for "Adjustable Mobile Phone Holder" issued to Wang on Oct. 10, 1995; U.S. Pat. No. 6,173,933 for "Multi-Position Articulating Mounting Apparatus for an Electronic Device" issued to Whiteside, et al. on Jan. 16, 2001; U.S. Design Patent 379,463 for "Telephone Holder" issued to Richter on May 27, 1997; U.S. Pat. No. 5,187,744 for "Hand-Held Portable Telephone Holder" issued to Richter on Feb. 16, 1993; U.S. Pat. No. 5,222,132 for "Support Bracket for Telephone" issued to Rioux, Jr. on Jun. 22, 1993; U.S. Pat. No. 5,305,381 or "Cradle for Telephone" issued to Wang, et al. on Apr. 19, 1994; U.S. Pat. No. 5,615,258 for "Portable Telephone Holder" issued to Ho on Mar. 25, 1997; U.S. Pat. No. 5,788,202 for "Support Device for Supporting Objects" issued to Richter on Aug. 4, 1998; U.S. Pat. No. 5,836,563 for "Mobile Phone Holder" issued to Hsin-Yung on Nov. 17, 1998; U.S. Pat. No. 6,073,901 for "Device for Supporting Objects" issued to Richter on Jun. 13, 2000; U.S. Pat. No. 6,229,893 for "Universal Hands-Free Receiver for a Mobile Telephone" issued to Chen on May 8, 2001; U.S. Pat. No. 6,256,387 for "Device Rack" issued to Wang on Jul. 3, 2001; U.S. Pat. No. 6,263,080 for "Holding Device for a Telephone Unit" issued to Klammer, et. al. on Jul. 17, 2001, the respective entirety of all being incorporated herein by reference. Other cradle devices may also qualify for use as the cradle 24 of the present invention. Most. known. cradle devices. that are structured to removably accept and securely support a normally hand-held portable device D qualify for use as the cradle 24 of the present invention.

Cradle 24 is rotatably coupled to chassis 14 through a substantially rigid central wheel 30 portion of the frame 16. The chassis frame 16 includes the central wheel 30 supported between the pair of spaced-apart brackets 18 having the straps 20. Cradle 24 is rotatably coupled to an outer surface or face 32 of central wheel 30 of the chassis frame 16. The wheel face 32 includes a substantially smooth and planar contact surface 34 that permits the cradle 24 to rotate smoothly and easily. Cradle 24 is rotatably coupled to the smooth face 32 of central.wheel 30 of the chassis frame 16 by one or more connectors 36. By example and without limitation, cradle 24 is rotatably coupled to central wheel face 32 by at least two connectors 36 passing through arcuate or part-circular grooves or slots 38 that are formed through the wheel face 32. By example and without limitation, two connectors 36 pass respectively through two different substantially concentric slots 38 that are formed through the wheel face 32 separated by spokes 40. Slots 38 are sized having a clearance width 42 relative to the connectors 36 such that the connectors 36 move easily along the arcs of the respective slots 38, as indicated by the arrows 44, 46. The cradle 24 having the device D installed therein is thus rotatable through the continuous series of intervening rotational orientations 25r between the normal stored orientation 25b and the normal operational orientation 25a.

Connectors 36 are secured to of a spine portion 48 of cradle 24 adjacent to back plane 28 by respective retainers 50. For example, the connectors 36 are screws sized to have a clearance fit with the clearance width 42 of the respective slots 38 and are secured to the back plane 28 of the cradle 24 using respective retainers 50 provided as square or hex nuts. Optionally, the retainers 50 are conventional lock nuts that lock by elastic or plastic flow of a portion of the nut material, or an adhesive coating is applied to the threads to lock the retainers 50 in a desirable arrangement with the respective connectors 36. Alternatively, the connectors 36 are rivets or another fastener of a type having a narrow shank between enlarged ends so that the retainers 50 are fixed in a desirable arrangement with the respective connectors 36.

The retainers 50 are tightened relative to the respective connectors 36 to control the positioning of the cradle 24 relative to the central wheel 30 portion of chassis frame 16, either tighter to restrict ease of rotation through the continuous intervening rotational orientations 25r between the normal operational orientation 25a and the normal stored orientation 25b, or looser to promote ease of rotation.

The enlarged ends of the connectors 36, i.e., the retainers 50, may be seated in respective counter-bores 52 recessed below the surface of the cradle back plane 28 to avoid interference with the device D. When the retainers 50 are configured as square or hex-shaped nuts, the counter-bores 52 may be formed with a matching square or hex shape for securing the fasteners against rotation while mating screw connectors 36 are installed to secure the cradle 24 to the chassis 14.

Figure 5:
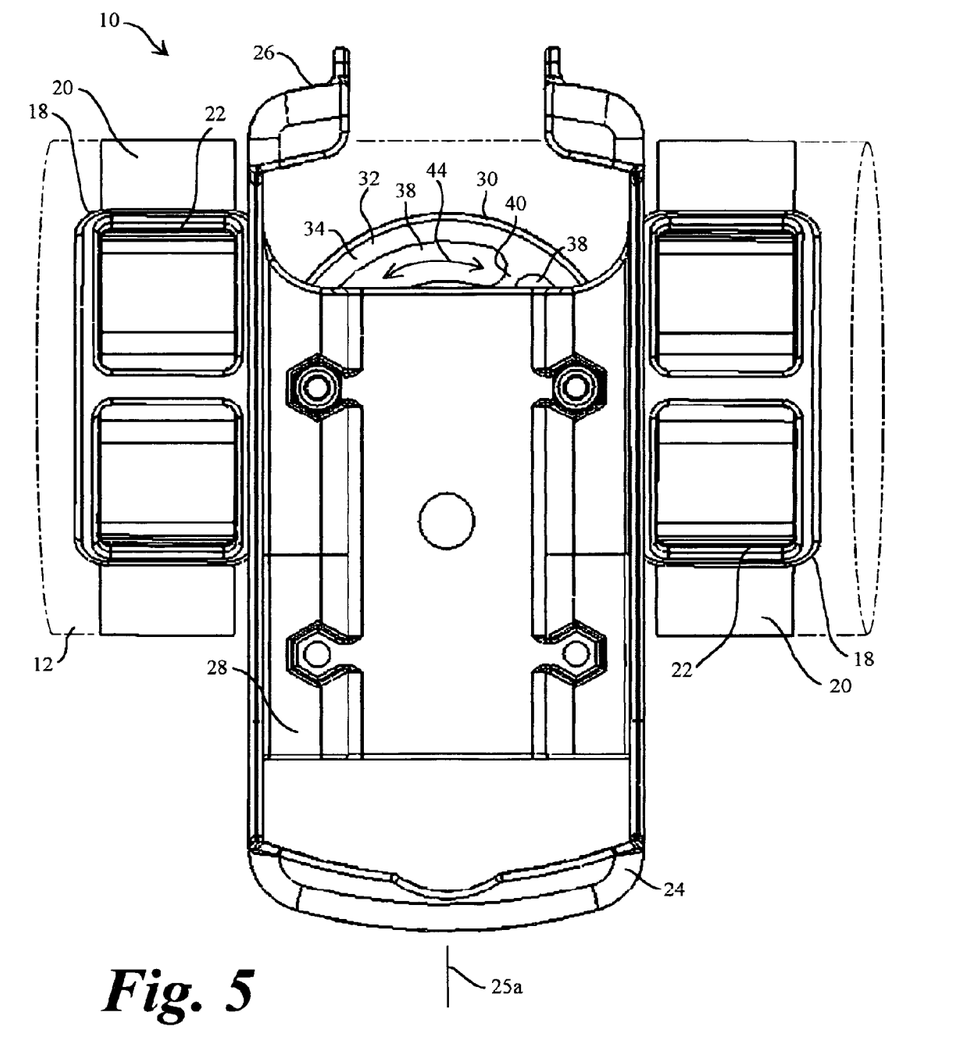
FIG. 5 is a plan view that illustrates the strap-on body mounting apparatus of the invention without the hand-held portable device being installed in the cradle, the cradle being illustrated by example and without limitation as positioned in the normal operational orientation.

FIG. 5 illustrates the body mounting apparatus 10 of the invention without the hand-held portable device D being installed in the cradle 24. The cradle 24 is illustrated by example and without limitation being positioned in the normal operational orientation 25a substantially cross-wise to the body extremity 12.

Figure 6:
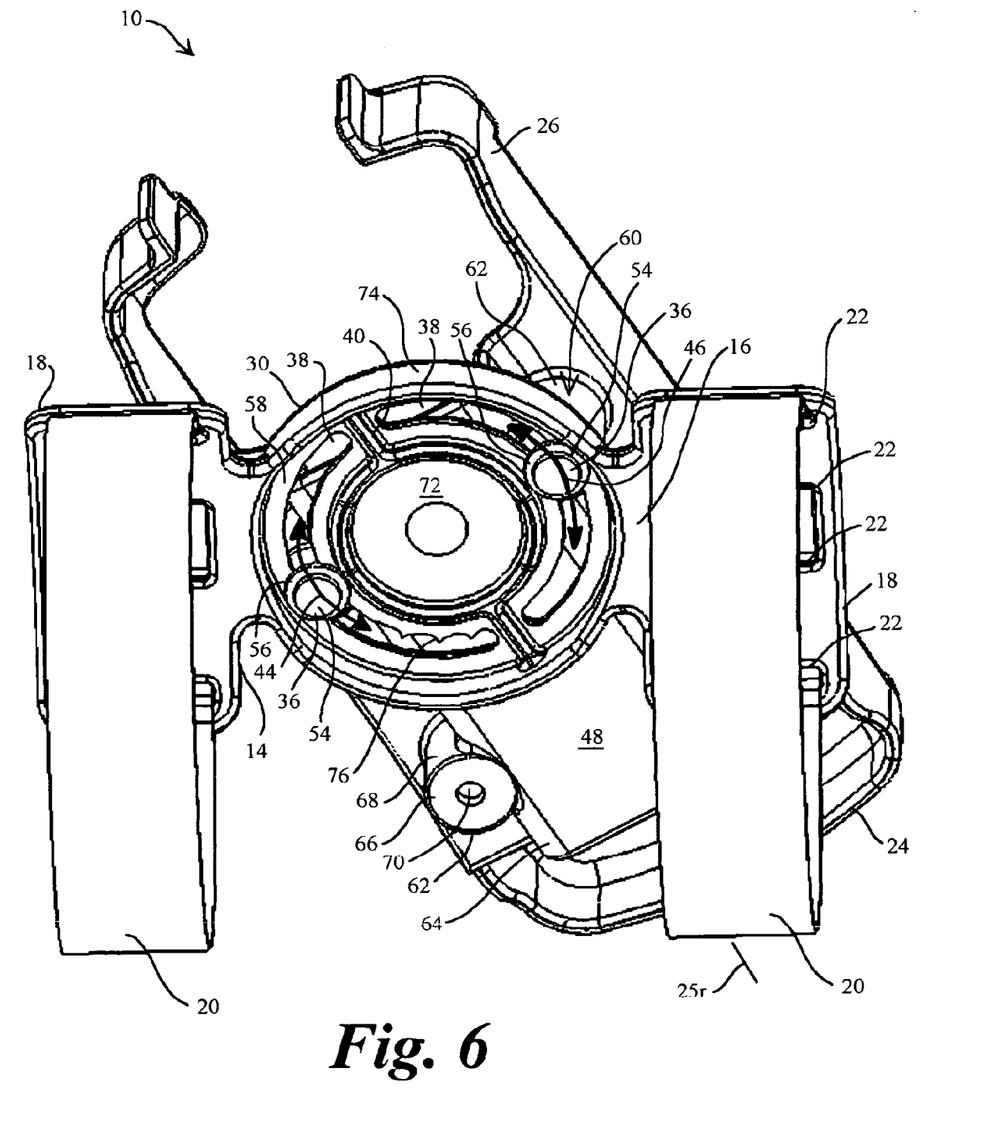
FIG. 6 is a perspective view showing the interior of the strap-on body mounting apparatus of the invention without the hand-held portable device being installed in the cradle.

FIG. 6 is a perspective view showing the interior of the body mounting apparatus 10 of the invention without the hand-held portable device D being installed in the cradle 24. Mounting apparatus 10 is illustrated with the chassis 14 having the frame 16 formed by the pair of spaced-apart brackets 18 that are structured to removably mount the mounting apparatus 10 on an arm or leg extremity 12 using the straps 20. Cradle 24 is rotatably supported by chassis 14 for removably mounting almost any normally hand-held portable device D. By example and without limitation, the connectors 36 are fashioned with respective retainer heads 54 that are oversized relative to the clearance width 42 of respective slots 38 so as to capture the cradle 24 against the central wheel 30 portion of the chassis frame 16. Washers 56 are optionally inserted over the respective the. connectors 36 between the respective retainer heads 54 and a back surface 58 of the chassis central wheel 30 opposite from the contact surface 34. The washers 56 are, for example, conventional flat metal washers provided to avoid rotation of the connectors 36 and keep the retainer 50 from loosening when they are nuts threaded onto screw connectors 36. Alternatively, the washers 56 are of a conventional non-stick or slippery material, for example, nylon or Teflon®, which ease rotation of the cradle 24 relative to the chassis central wheel 30, as well as keeping the retainer 50 from loosening when they are nuts threaded onto screw connectors 36. According to another alternative, the washers 56 are conventional spring washers, such as wave or bellville washers, that operate between the respective retainer heads 54 and the chassis central wheel 30 for tensioning or pre-loading the interface 60 (see, e.g., FIG. 9) between the cradle 24 and the chassis central wheel 30.

Cradle 24 is illustrated as including a substantially rigid integral connector interface structure 62 formed exterior to a back or under surface 64 of the spine 48 opposite from the cradle back plane 28 and device retention structure 26. The connector interface structure 62 is structured to receive the connectors 36 after insertion through the respective slots 38 in the central wheel 30 portion of the frame 16 between spokes 40.

Interface structure 62 interfaces with the chassis contact surface 34 through one or more interface surfaces 66. For example, the interface structure 62 optionally includes a pair of pedestals or bosses 68 that are integrally formed on the exterior surface 64 of the cradle spine 48. The connectors 36 are inserted through respective spaced-apart fastener clearance holes 70 contained in the bosses 68, respectively. Interface surfaces 66 are formed on the bosses 68 as a pair of substantially co-planar smooth and planar spaced-apart interface surfaces 66. Interface surfaces 66 interface with the substantially smooth planar contact surface 34 portion of the face 32 of the central wheel 30. Optionally, the bosses 68 space the cradle exterior back surface 64 away from the face 32 of the central wheel 30 portion of the frame 16 such that only the end interface surfaces 66 of the respective bosses 68 interface with the substantially smooth planar contact surface 34 portion of the face 32 of the central wheel 30. Optionally, as illustrated here, the cradle 24 includes two or more of the interface structures 62 so that the user can select between the interface structures 62 for securing the cradle 24 in one of a variety of different arrangements with the chassis 14.

As illustrated here, the arcuate or part-circular grooves or slots 38 are interrupted only by the spokes 40 between an inner or hub portion 72 of the wheel 30 inside the slots 38, and an outer or felly portion 74. Thus, the slots 38 extend nearly 180 degrees around the central wheel portion 30. The connectors 36 cooperate with the slots 38 to permit the cradle 24 to rotate nearly the full 180 degrees relative to the central wheel 30 portion of the chassis frame 16. However, in normal use relative rotation of the cradle 24 can be limited to about 90 degrees or even as little as about 75 degrees and may still perform the intended function adequately. Therefore, in a practical apparatus 10, the slots 38 can be shortened to stiffen the chassis frame 16. Alternatively, the number of connectors 36 cooperating with the slots 38 can be increased to increase security of the cradle 24. An increased number of connectors 36 may even smooth the rotation of the cradle 24 relative to the central wheel 30 portion of the chassis frame 16.

Optionally, one or more detents 76 are extended into the one or both slots 38 to releasably capture the respective connectors 36 for restraining the cradle 24 in a selected orientation relative to the chassis 16, including the operational orientation 25a, the stored orientation 25b, or one of the continuous series of intervening rotational orientations 25r therebetween.

Figure 7:
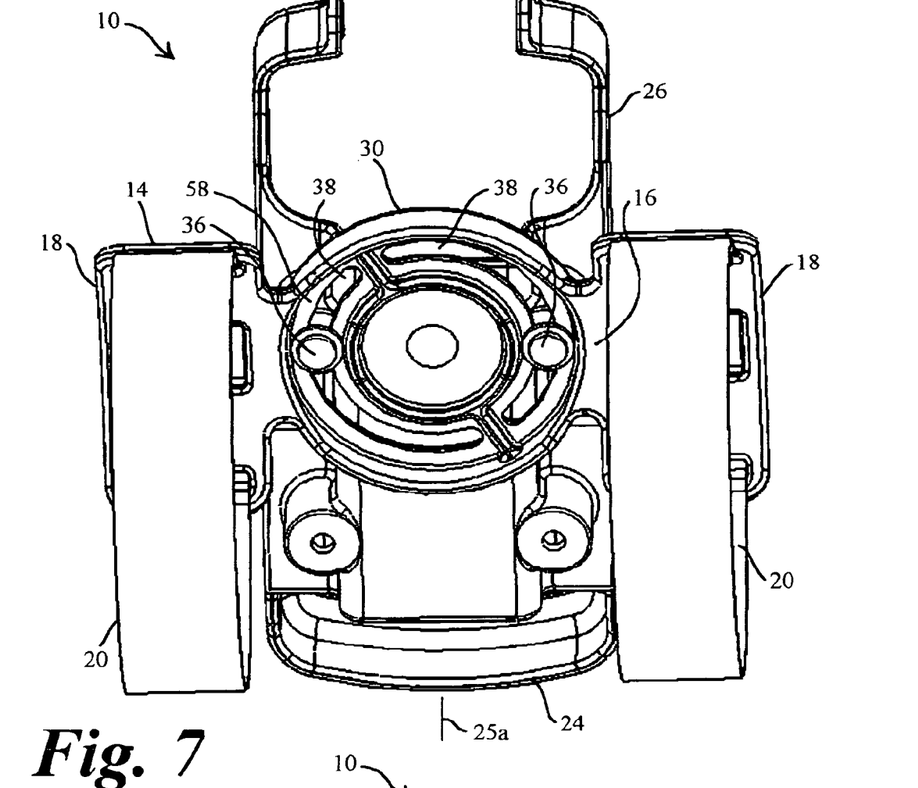
FIG. 7 is a perspective view showing the interior of the strap-on body mounting apparatus of the invention with the hand-held portable device being omitted for clarity and having the cradle portion substantially positioned in the normal operational orientation.

FIG. 7 is a perspective view showing the interior of the body mounting apparatus 10 of the invention with the hand-held portable device D being omitted for clarity and having the cradle 24 substantially positioned in the normal operational orientation 25a that is substantially cross-wise to the body extremity 12.

Figure 8:
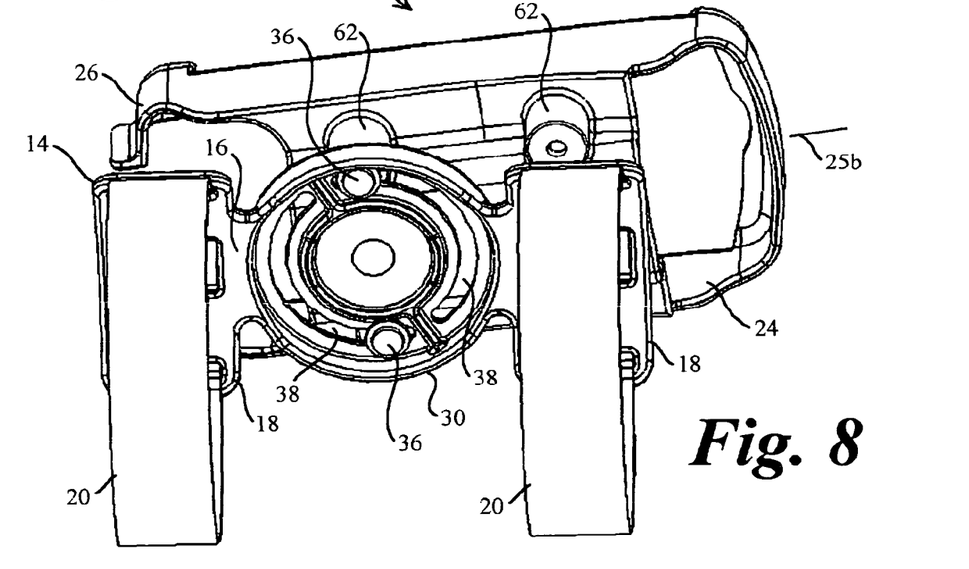
FIG. 8 is another perspective view showing the interior of the strap-on body mounting apparatus of the invention with the hand-held portable device being omitted for clarity and having the cradle portion substantially positioned in the normal stored orientation.

FIG. 8 is another perspective view showing the interior of the body mounting apparatus 10 of the invention with the hand-held portable device D being omitted for clarity and having the cradle 24 substantially positioned in the normal stored orientation 25b that is substantially aligned with the body extremity 12.

Figure 9:
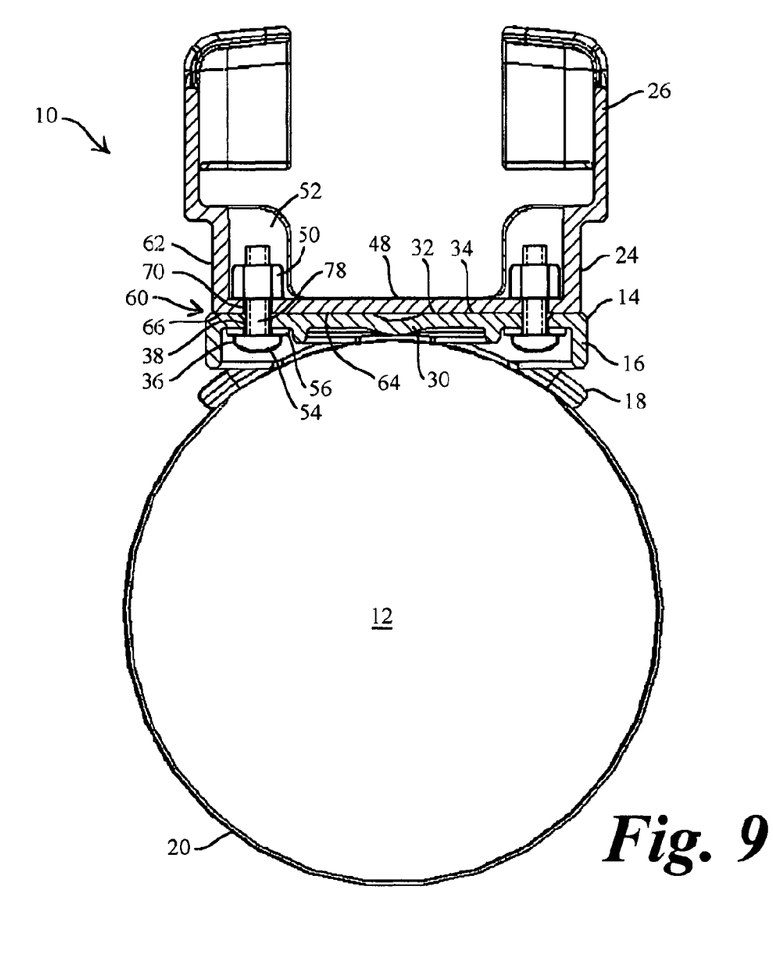
FIG. 9 is an end cross-sectional view of the strap-on body mounting apparatus of the invention with the hand-held portable device being omitted for clarity and having the cradle portion substantially positioned in the normal stored orientation.

FIG. 9 is an end cross-sectional view of the body mounting apparatus 10 of the invention with the hand-held portable device D being omitted for clarity and having the cradle 24 substantially positioned in the normal stored orientation 25b that is substantially aligned with the body extremity 12. The connectors 36 are illustrated as being screws with respective threaded shanks 78 passing through the respective clearance slots 38 in the central wheel 30 portion of chassis frame 16 and through corresponding respective spaced-apart fastener clearance holes 70 contained in the bosses 68, respectively. The connectors 36 are illustrated having respective retainer heads 54 seated against back surface 58 of the chassis central wheel 30 opposite from the cradle 24. The optional washers 56 are illustrated between the respective retainer heads 54 and back surface 58 of the chassis central wheel 30. Respective retainers 50 are provided as nuts on the threaded shanks 78 seated inside the respective pedestals or bosses 68 of the interface structure 62. The nut retainers 50 can be moved along the connector shanks 78 toward or away from the respective retainer heads 54 for increasing or decreasing compression of the cradle 24 against the contact surface 34 of chassis central wheel 30. Cradle 24 is thus rotatably secured to the chassis frame 16 against the contact surface 34 of the outer surface or face 32 of central wheel 30 by the threaded shanks 78 of the respective connectors 36 being slidable along the respective arcs 42 of the slots 38.

While illustrated by example as one pair of spaced-apart fastener clearance holes 70, the connector interface structure 62 is not to limited the exemplary embodiment depicted. Rather, the connector interface structure 62 optionally has more or less of the fastener clearance holes 70.

While illustrated as being generally circular in contour, the straps 20 are expected to be generally flexible, for example a fabric or plastic, and so able to take different shapes to conform to different body parts, such as arm or leg extremities 12 or the wearer's shoulder, as described herein.

Figure 10:
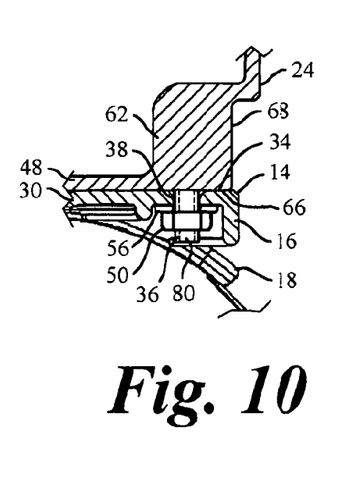
FIG. 10 is a break-out view of the strap-on body mounting apparatus of the invention that illustrates connectors between the chassis and cradle portions being alternatively configured as threaded studs.

FIG. 10 illustrates the connectors 36 alternatively configured as studs threaded into or integrally molded with the respective pedestals or bosses 68 of the interface structure 62. The connectors 36 thus project from the cradle 24 at the substantially smooth and planar end interface surfaces 66 of the interface bosses 68. A shank portion 80 of the respective stud connectors 36 extends through the slots 38 in the face 32 of chassis central wheel 30. The end interface surfaces 66 of the bosses 68 interface with the contact surface 34 of the central wheel face 32, and retainers 50 configured as nuts on the threaded shanks 80 secure the cradle 24 to the chassis 16.

Figure 11:
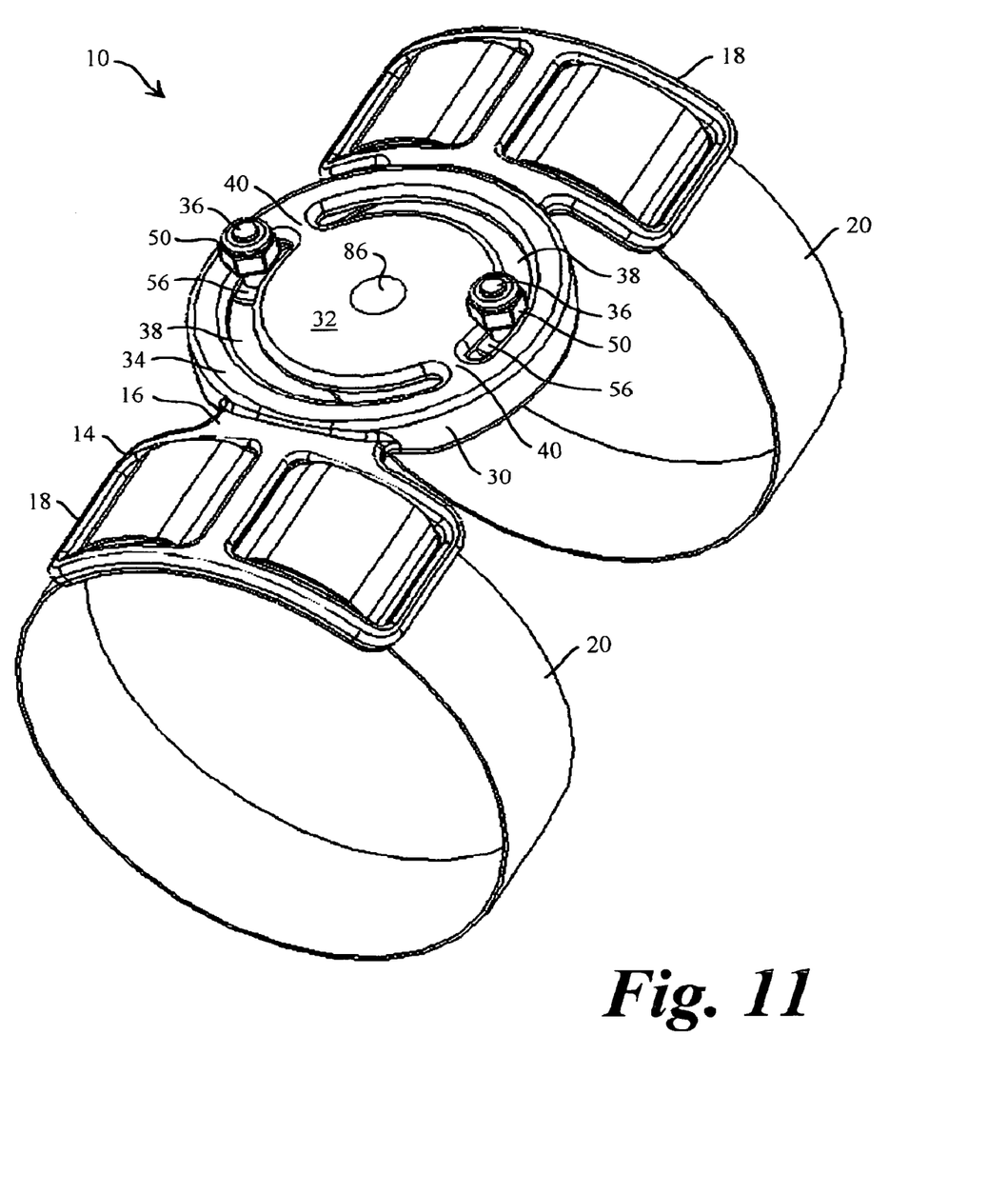
FIG. 11 is a perspective view that illustrates the chassis portion of the strap-on body mounting apparatus of the invention with the cradle portion omitted for clarity.

FIG. 11 illustrates the body mounting apparatus 10 of the invention with the cradle 24 omitted for clarity. Here, the two substantially concentric slots 38 that are illustrated having substantially same radius such they are substantially co-circular on the central wheel face 32. As discussed herein, the retainers 50 are tightened relative to the respective connectors 36 to control the positioning of the cradle 24 relative to the central wheel 30 portion of chassis frame 16, either tighter to restrict ease of rotation through the continuous intervening rotational orientations 25r between the normal operational orientation 25a and the normal stored orientation 25b, or looser to promote ease of rotation.

Figures 12, 13:
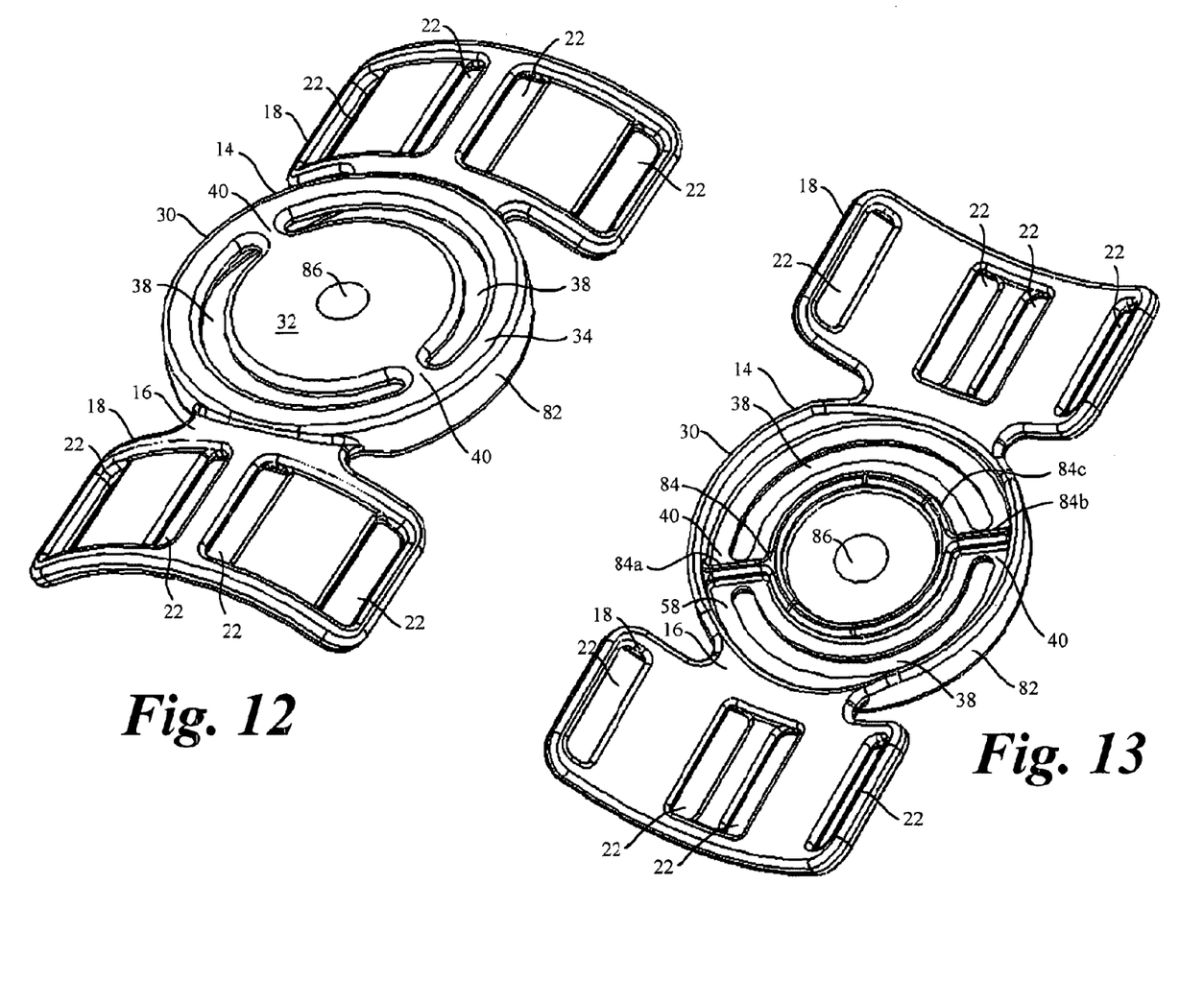
FIG. 12 is a top perspective view of just the chassis portion of the strap-on body mounting apparatus of the invention.
FIG. 13 is a bottom perspective view of just the chassis portion of the strap-on body mounting apparatus of the invention.

FIG. 12 is a top perspective view of the chassis 14 alone wherein the strap slots 22 in the formed by a pair of spaced-apart brackets 18 are more clearly shown. The contact surface 34 of the chassis central wheel 30 is illustrated by example and without limitation as an unbroken ring.

FIG. 13 is a bottom perspective view of the chassis 14 alone wherein the chassis frame 16 is shown, by example and without limitation, as including an optional peripheral lip or skirt 82 substantially surrounding the central wheel 30 and extended downward away from the wheel face 32. The skirt 82 acts as a stiffener so the central wheel 30 can be kept thin, whereby the weight and overall height of the mounting apparatus 10 is minimized. The optional lip or skirt 82 optionally couples into the brackets 18 on either side of the central wheel 30 to increase rigidity of the overall chassis 14. Curvature of the brackets 18 also increases overall stiffness as well as conforming the frame 16 to the body extremity 12 in use on the wearer. The back surface 58 of the chassis central wheel 30, opposite from the contact surface 34, is optionally formed with one or more stiffeners 84, including stiffeners 84a, 84b along the spokes 40 between the inner or hub portion 72 of the wheel 30 inside the slots 38, and the outer or felly portion 74. The hub portion 72 of the wheel 30 is optionally stiffened with another stiffener 84c shown by example and without limitation as circular stiffener.

As discussed above, cradle 24 is rotatable relative to chassis 14 between the normal operational orientation 25a substantially cross-wise to the body extremity 12 (shown in FIG. 2) and the normal stored orientation 25b (shown in FIG. 3) substantially aligned with the body extremity 12, with the cradle 24 passing through the continuous series of intervening rotational orientations 25r (shown in FIG. 1) any of which may be useful as a substitute for the operational orientation 25a. Tension provided by the connectors 36 between the cradle interface structure 62 and the contact surface 34 of the central wheel face 32 operates to temporarily retain the cradle 24 in a desired orientation relative to the chassis 14, including one or more of the operational orientation 25a, the stored orientation 25b, or one of the continuous series of intervening rotational orientations 25r therebetween.

Figures 14, 15:
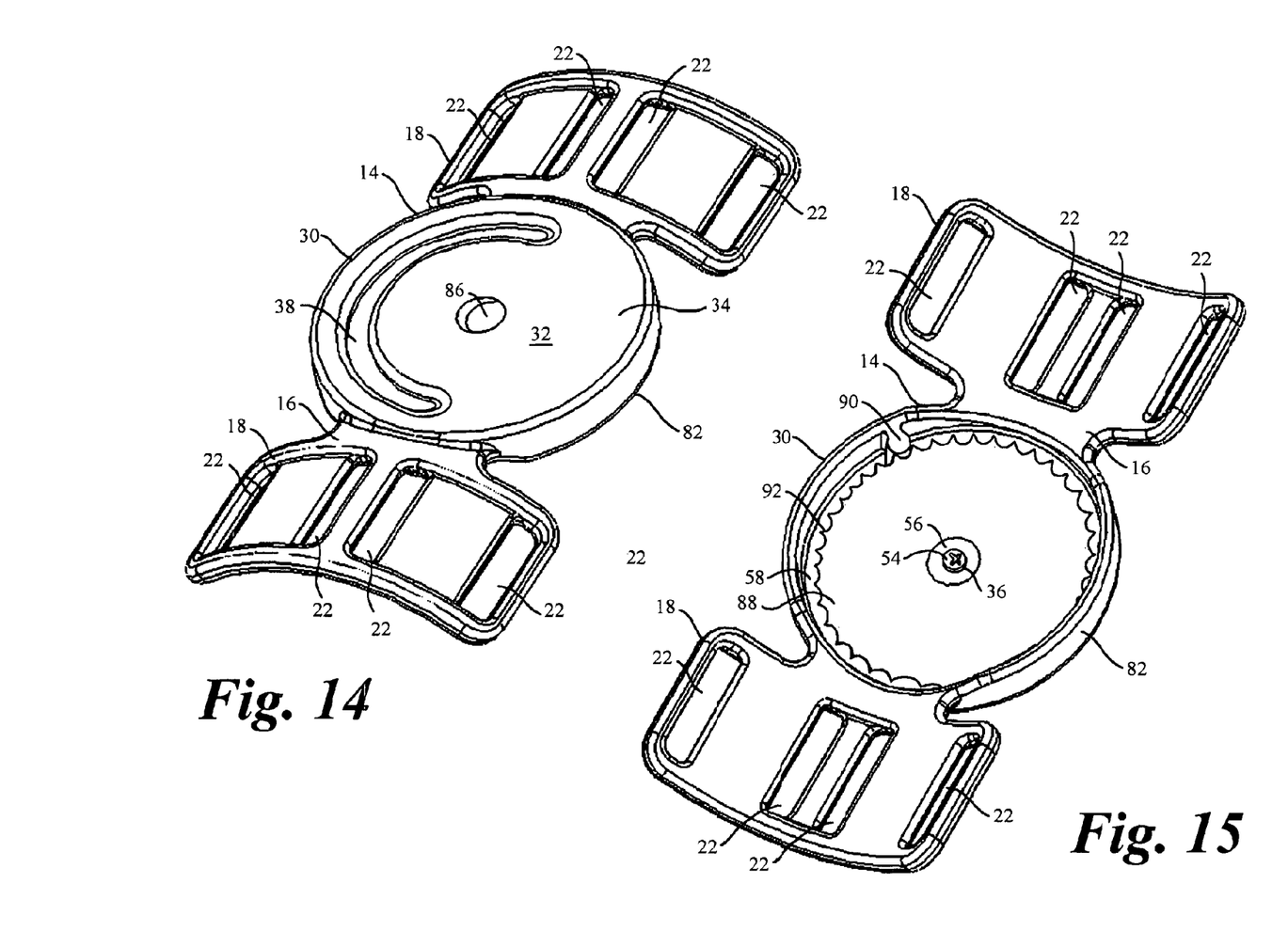
FIG. 14 is a top perspective view of just the chassis portion of an alternative embodiment of the strap-on body mounting apparatus of the invention.
FIG. 15 is a bottom perspective view.

FIG. 14 illustrates an alternative configuration of the chassis 14 having a single round aperture 86 at the center of the central wheel 30 and a single semi-circular slot 38 adjacent to the periphery of the central wheel 30 and concentric with the aperture 86. The cradle 24 is attached with one of the connectors 36 pinning one of the bosses 68 of the interface structure 62 to the central aperture 86, while another of the connectors 36 couples the other of the spaced-apart interface structure bosses 68 to the single slot 38. Accordingly, the connector 36 only rotates in the aperture 86, while the connector 36 slides in the slot 38, so that the cradle 24 rotates about the central aperture 86 guided by the connector 36 in the slot 38. The slot 38 is, for example, about 90 degrees or more in arc length, and may be as long as about 180 degrees, as shown.

Figure 16:
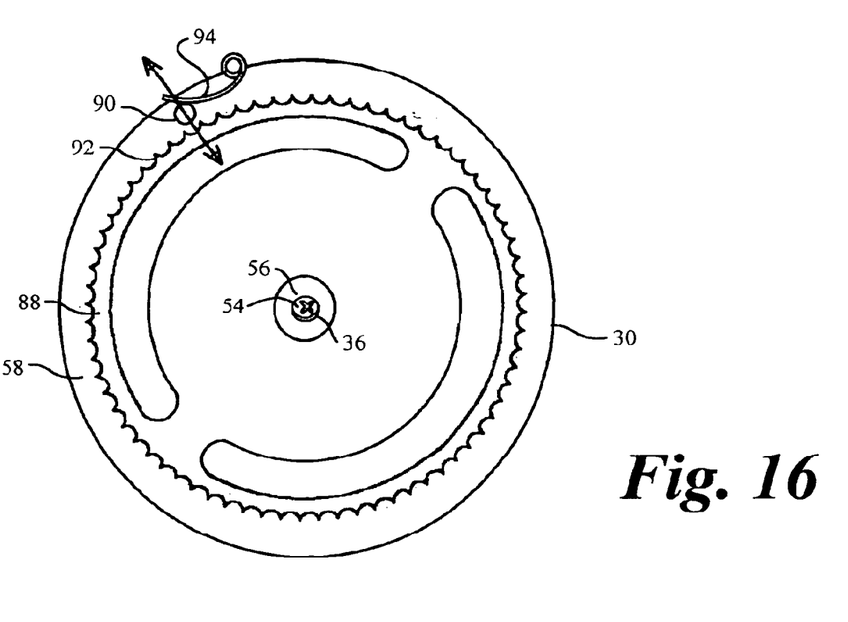
FIG. 16 is a bottom plan view.
Figure 17:
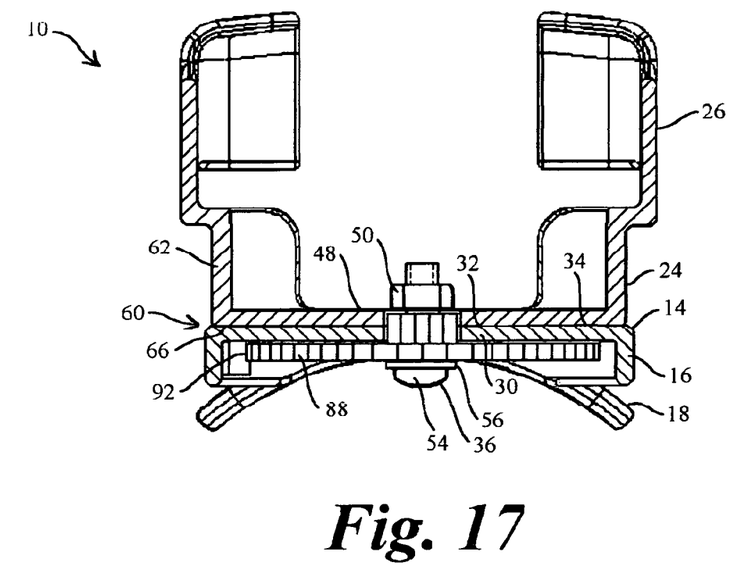
FIG. 17 is an end cross-sectional view.

FIGS. 15, 16 and 17 illustrate the apparatus 10 of the invention wherein the slots 38 in the chassis central wheel 30 are replaced by the central aperture 86 in combination with a peripherally toothed ratchet disk 88 coupled to the cradle interface structure 62 by the connector 36. One of the washers 56 is optionally inserted between the connector retainer head 54 and the ratcheted disk 88 for one or more of the reasons discussed above. A ratchet detent 90 is provided, for example on the inside of the lip or skirt 82 around the central wheel 30. The ratchet detent 90 cooperates with peripheral teeth 92 of the ratchet disk 88 to temporarily retain the cradle 24 orientation relative to the chassis 14, including one or more of the operational orientation 25a, the stored orientation 25b, or one of the continuous series of intervening rotational orientations 25r therebetween.

FIG. 16 illustrates the ratchet detent 90 alternatively configured to move into and away from the ratchet disk 88 to alternately engage and disengage the peripheral teeth 92. For example, the ratchet detent 90 is urged into engagement with the peripheral teeth 92, as by a spring device 94 that also permits the ratchet detent 90 to be pushed aside to let the ratchet disk 88 turn, as shown by the arrow.

FIG. 17 is a cross-sectional view of the body mounting apparatus 10 of the invention that illustrates by example and without limitation the peripherally toothed ratchet disk 88 in combination with the cooperating ratchet detent 90. The ratchet disk 88 includes means for maintaining orientation with the cradle 24. For example, a key 96 projects from the ratchet disk 88 through the central aperture 86 in the chassis central wheel 30 and into a complementary keyway 98 formed in or through the cradle interface structure 62. The key 96 and keyway 98 cooperate to maintain orientation between the ratchet disk 88 and the cradle 24, while the ratchet detent 90 cooperates with the ratchet disk peripheral teeth 92 to temporarily fix the cradle 24 orientation relative to the chassis 14.

While the preferred embodiment of the invention has been illustrated and described, it will be appreciated that various changes can be made therein without departing from the spirit and scope of the invention. For example, materials may be substituted for the different components of the chassis and device cradle elements of the invention without departing from the spirit and scope of the invention. Therefore, the inventor makes the following claims.

What is claimed is:

1. A body mount apparatus, comprising:
   a chassis formed with a contact surface and one or more brackets structured for removably coupling the chassis to an external wearer with the contact surface facing away from the wearer;
   a device cradle structured for removably mounting an external device, the device cradle being structured with an interface surface; and
   structure coupled between the device cradle and the chassis for coupling the interface surface of the device cradle in rotatably slidable relationship with the contact surface of the chassis.

2. The apparatus of claim 1 wherein the one or more brackets further comprises a pair of spaced-apart brackets that are structured to cooperate with a pair of flexible couplings.

3. The apparatus of claim 1 wherein the chassis further comprises a frame having the one or more brackets supporting a central portion formed with the contact surface.

4. A body mount apparatus, comprising:
   a chassis comprising a frame having one or more brackets supporting a central portion formed with a contact surface and one or more apertures formed through the central portion and the contact surface thereof, the one or more brackets being structured for removably coupling the chassis to an external wearer with the contact surface facing away from the wearer;
   a device cradle structured for removably mounting an external device, the device cradle being structured with an interface surface; and
   structure coupled between the device cradle and the chassis for rotatably coupling the interface surface of the device cradle relative to the contact surface of the chassis, the structure further comprising a connector through each of the apertures.

5. The apparatus of claim 4 wherein the one or more apertures formed through the central portion and the contact surface thereof further comprises two part-circular slots.

6. The apparatus of claim 5 wherein the structure coupled between the device cradle and the chassis further comprises an interface structure formed integrally with the cradle and having an interface surface positioned to interface with the contact surface of the chassis central portion.

7. The apparatus of claim 6 wherein the interface structure of the cradle further comprises a pair of spaced apart bosses that are integrally formed on an exterior surface of the cradle, each of the bosses having an interface surface positioned to interface with the contact surface of the chassis central portion.

8. A body mount apparatus, comprising:
   a chassis having a frame formed by a central wheel supported between a pair of spaced-apart brackets that are structured to removably mount the chassis external of a body part with a contact surface of the central wheel facing outwardly away from the body part;
   a device cradle comprising device retention structure and an interface structure formed on an exterior back surface of the device retention structure; and
   one or more connectors coupled between the chassis central wheel and the cradle interface structure for rotatably securing the device cradle to the chassis with the interface structure being slidably interfaced with the contact surface of the chassis central wheel.

9. The apparatus of claim 8 wherein the contact surface of the chassis central wheel further comprises a substantially smooth and planar surface; and
   the interface structure further comprises a substantially smooth and planar interface surface positioned to interface with the contact surface of the chassis central wheel.

10. The apparatus of claim 9 wherein the chassis central wheel further comprises a pair of part-circular slots formed therethrough, the one or more connectors are coupled between the chassis central wheel and the cradle interface structure through the pair of part-circular slots.

11. The apparatus of claim 10 wherein the interface structure further comprises a pair of spaced-apart bosses that are integrally formed on an exterior surface of the cradle, the bosses further comprising the interface surface in slidable contact with the contact surface of the chassis central wheel.

12. The apparatus of claim 11 wherein one or more of the connectors further comprise means for changing compression of the cradle interface surface against the contact surface of the chassis central wheel.

13. The apparatus of claim 12 wherein each of the brackets further comprises one or more slots; and further comprising flexible couplings threaded through each of the slots.

14. A body mount apparatus, comprising:
   a substantially rigid chassis formed of a frame having a substantially rigid central wheel portion supported between brackets, the central wheel portion being formed with a contact having one or more apertures formed therethrough with at least one of the apertures being formed as a slot;
   a device cradle rotatably coupled to the chassis central wheel portion through an interface structure, the interface structure having an interface surface slidably interfaced with the contact surface;

a plurality of connectors coupled between the chassis central wheel portion and the cradle interface structure, one of the plurality of connectors passing through each of the one or more apertures; and one or more flexible couplings coupled to the brackets and being structured for removably coupling the chassis to an external wearer with the device cradle external of the contact surface and facing away from the wearer.

15. The apparatus of claim 14 wherein each of the one or more apertures further comprises a part-circular slot formed through the chassis central wheel portion.

16. The apparatus of claim 15 wherein the part-circular slots are substantially co-circular.

17. The apparatus of claim 15 wherein the cradle interface structure further comprises a pair of bosses that are integrally formed on an exterior surface of the cradle, and the connectors are inserted through respective spaced-apart fastener clearance holes through the bosses.

18. The apparatus of claim 17 wherein each of the pair of bosses further comprises a pair an interface surface slidably interfaced with the contact surface.

19. The apparatus of claim 15 wherein each of the plurality of connectors further comprises a threaded fastener having a respective retainer head that is oversized relative to a clearance width of the respective slots.

20. The apparatus of claim 15 wherein each of the interface surface and the contact surface further comprise substantially planar smooth surfaces.

21. A body mount apparatus, comprising:

a chassis formed with a contact surface and one or more brackets structured for removably coupling the chassis to an external wearer with the contact surface facing away from the wearer;

a device cradle structured for removably mounting an external device, the device cradle being structured with an interface surface; and one or more connectors coupled between the device cradle and the chassis for retaining the device cradle relative to the chassis and coupling the interface surface of the device cradle in rotatably slidable relationship with the contact surface of the chassis.

* * * * *